US011722866B2

United States Patent
Shin et al.

(10) Patent No.: US 11,722,866 B2
(45) Date of Patent: Aug. 8, 2023

(54) APPARATUS FOR CONTROLLING A VEHICLE USING LOW POWER COMMUNICATION AND METHOD THEREOF

(71) Applicants: HYUNDAI MOTOR COMPANY, Seoul (KR); KIA MOTORS CORPORATION, Seoul (KR)

(72) Inventors: Won Ho Shin, Seoul (KR); Dong Hee Han, Seoul (KR); Hee Jun Lee, Seoul (KR); Dong Youl Lee, Seoul (KR); Jae Am Seo, Seongnam-si (KR); Sun Woo Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 222 days.

(21) Appl. No.: 16/839,810

(22) Filed: Apr. 3, 2020

(65) Prior Publication Data
US 2021/0185495 A1    Jun. 17, 2021

(30) Foreign Application Priority Data
Dec. 13, 2019 (KR) .................. 10-2019-0167080

(51) Int. Cl.
*H04W 4/44* (2018.01)
*H04W 4/46* (2018.01)
(Continued)

(52) U.S. Cl.
CPC .............. *H04W 4/44* (2018.02); *B60R 25/01* (2013.01); *B60R 25/24* (2013.01); *B60R 25/33* (2013.01); *G07C 5/008* (2013.01); *H04B 1/3822* (2013.01); *H04L 12/40* (2013.01); *H04W 4/12* (2013.01); *H04W 4/46* (2018.02); *H04W 12/03* (2021.01); *H04W 52/0235* (2013.01);
(Continued)

(58) Field of Classification Search
CPC ......... H04W 4/44; H04W 4/46; H04W 12/03; H04W 4/12; H04W 52/0235; H04W 52/0251; H04W 80/12; B60R 25/01; B60R 25/24; B60R 25/33; G07C 5/008; H04B 1/3822; H04L 12/40; H04L 2012/40215; H04L 2012/40273
See application file for complete search history.

(56) References Cited

U.S. PATENT DOCUMENTS 6,229,452 B1 * 5/2001 Kull ...................... B60T 13/665
                                                      701/19
8,989,053 B1 * 3/2015 Skaaksrud .............. H04W 4/38
                                                      370/255
(Continued)

FOREIGN PATENT DOCUMENTS

| KR | 101715331 B1 | 3/2017 |
| KR | 101876166 B1 | 7/2018 |
| KR | 102080117 B1 | 2/2020 |

*Primary Examiner* — Dominic E Rego
(74) *Attorney, Agent, or Firm* — Morgan, Lewis & Bockius LLP

(57) ABSTRACT

An apparatus for controlling a vehicle and a method thereof are provided. The apparatus includes a connectivity control unit (CCU) to internetwork with a server through a wireless network to provide a connected car service and an integrated body unit (IBU) to perform low power communication with another vehicle to control the CCU.

9 Claims, 7 Drawing Sheets

(51) Int. Cl.
  *H04W 12/03*    (2021.01)
  *H04W 4/029*    (2018.01)
  *H04L 12/46*    (2006.01)
  *B60R 25/01*    (2013.01)
  *H04W 52/02*    (2009.01)
  *H04L 12/40*    (2006.01)
  *H04W 4/12*     (2009.01)
  *G07C 5/00*     (2006.01)
  *B60R 25/24*    (2013.01)
  *B60R 25/33*    (2013.01)
  *H04B 1/3822*   (2015.01)
  *H04W 80/12*    (2009.01)

(52) U.S. Cl.
  CPC ............... *H04W 52/0251* (2013.01); *H04L 2012/40215* (2013.01); *H04L 2012/40273* (2013.01); *H04W 80/12* (2013.01)

(56) References Cited

U.S. PATENT DOCUMENTS

| | | | | |
|---|---|---|---|---|
| 10,733,865 | B2* | 8/2020 | Lundy | G08B 21/02 |
| 11,070,962 | B2* | 7/2021 | Jin | G01C 21/3682 |
| 2002/0105443 | A1* | 8/2002 | Flick | B60R 25/102 |
| | | | | 340/539.3 |
| 2008/0204281 | A1* | 8/2008 | Sugiura | B60R 25/24 |
| | | | | 340/988 |
| 2008/0262722 | A1* | 10/2008 | Haag | G01C 21/265 |
| | | | | 701/412 |
| 2008/0268866 | A1* | 10/2008 | Sukkarie | H04W 4/02 |
| | | | | 455/456.2 |
| 2011/0034144 | A1* | 2/2011 | Yang | G01S 19/34 |
| | | | | 455/343.2 |
| 2014/0078889 | A1* | 3/2014 | Diab | H04L 69/40 |
| | | | | 370/221 |
| 2014/0108843 | A1* | 4/2014 | Choho | G06F 1/3234 |
| | | | | 713/323 |
| 2014/0121898 | A1* | 5/2014 | Diab | H04L 67/12 |
| | | | | 701/36 |
| 2015/0123762 | A1* | 5/2015 | Park | G07C 9/00182 |
| | | | | 340/5.51 |
| 2015/0130641 | A1* | 5/2015 | Rahman | H04W 84/18 |
| | | | | 340/932.2 |
| 2016/0036596 | A1* | 2/2016 | Fukushima | H04N 1/00002 |
| | | | | 370/241 |
| 2016/0233949 | A1* | 8/2016 | Tillet | H04W 4/10 |
| 2016/0360106 | A1* | 12/2016 | Kurosaki | G06F 9/4418 |
| 2017/0088072 | A1* | 3/2017 | Curtis | G08B 31/00 |
| 2017/0123782 | A1* | 5/2017 | Choi | G06F 8/65 |
| 2018/0043876 | A1* | 2/2018 | Houtman | B60T 8/885 |
| 2018/0050662 | A1* | 2/2018 | Sanji | B60R 25/241 |
| 2018/0092017 | A1* | 3/2018 | Freda | H04B 7/15528 |
| 2018/0124823 | A1* | 5/2018 | Liu | H04W 48/16 |
| 2018/0136655 | A1* | 5/2018 | Kim | G05D 1/0088 |
| 2018/0334163 | A1* | 11/2018 | Beauvais | B62D 15/0285 |
| 2019/0132709 | A1* | 5/2019 | Graefe | G08G 1/0133 |
| 2019/0175149 | A1* | 6/2019 | Dickie | A61B 8/4254 |
| 2019/0222652 | A1* | 7/2019 | Graefe | H04W 84/18 |
| 2019/0297798 | A1* | 10/2019 | Levine | G06F 9/542 |
| 2020/0007828 | A1* | 1/2020 | Hu | H04N 7/188 |
| 2020/0023841 | A1* | 1/2020 | Hayama | G01C 21/26 |
| 2020/0108819 | A1* | 4/2020 | Revach | B60W 20/13 |
| 2020/0242855 | A1* | 7/2020 | Sandu | G16Y 20/10 |
| 2020/0398640 | A1* | 12/2020 | Chang | B60H 1/00778 |
| 2022/0019940 | A1* | 1/2022 | Suganuma | G06F 9/5072 |

* cited by examiner

|   | DATA TYPE | DESCRIPTION |
|---|---|---|
| 1 | Map_GNSS_LatPos | GNSS_Lateral Position Value w/ Map Matching |
| 2 | Map_GNSS_LongPos | GNSS_Longitudinal Position Value w/ Map Matching |
| 3 | Map_GNSS_AltPos | Altitude Value w/ Map Matching(Elevation Position) |
| 4 | Map_GNSS_PDOP | Position Dilution of Precision for GNSS w/ Map Matching |
| 5 | Map_GNSS_HDOP | Horizintal Dilution of Precision for GNSS w/ Map Matching |
| 6 | Map_GNSS_Hding | GNSS Heading Value w/ Map Matching |
| 8 | TIME | ACC OFF TIME POINT TIME |

FIG.4

APPARATUS FOR CONTROLLING A VEHICLE USING LOW POWER COMMUNICATION AND METHOD THEREOF

CROSS-REFERENCE TO RELATED APPLICATION

The present application claims priority to and the benefit of Korean Patent Application No. 10-2019-0167080, filed on Dec. 13, 2019, which is incorporated herein by reference in its entirety.

TECHNICAL FIELD

The present disclosure relates to an apparatus for controlling a vehicle and a method thereof, and more particularly to a technology of providing a connected car service even in a vehicle start OFF state through low power communication.

BACKGROUND

The statements in this section merely provide background information related to the present disclosure and may not constitute prior art.

Recently, smart vehicles have been rapidly developed in combination with information technology (IT).

The appearance of 'Key FOB', which is called 'Smart Key', brings a big change in car operation.

A smart key system is able to open or close a vehicle door and start a vehicle at the outside of the vehicle even if a driver does not insert a separate key into a key box of the vehicle or does not perform a special manipulation for the operation of the vehicle. The smart key system employs a portable smart card or a smart key such as an FOB for wireless communication.

When a driver having the smart key approaches the vehicle, the vehicle is automatically unlocked through low frequency communication (LF) and radio frequency (RF) communication. Accordingly, even if the driver does not insert a separate key into the key box, the driver may open the door and may start the vehicle without inserting the start key after getting on the vehicle.

In detail, the smart key system in the vehicle performs i) a procedure of transmitting an LF signal for transmitting an authentication request signal to the smart key ii) a procedure of receiving an RF signal for receiving an authentication response signal from the smart key. In this case, the vehicle may receive the authentication response signal from the smart key only when the smart key is close to the vehicle, due to the limitation in the transmission distance of the LF signal having frequency band lower than that of the RF signal, In particular, vehicle manufacturers have recently been interested in connected car services for enhancing safety and convenience of vehicle drivers and passengers, and providing various information and multimedia contents.

In a conventional vehicle, a telematics communication module may be controlled to receive data transmitted from a telematics center only for a specific time after vehicle start OFF, due to a dark current problem of the vehicle when a mobile terminated connected car service is performed in the state that the vehicle is started off (vehicle start OFF).

In the conventional vehicle, the telematics communication is controlled to perform only a mobile originated (MO) connected car service by deactivating (that is, shutdown) the operation of the telematics communication module after the specific time is elapsed from the commencement of the MO connected car service in the vehicle start OFF.

However, the driver cannot receive the MT connected car service any more until the vehicle starts on (vehicle start ON) after a specific time is elapsed from the vehicle start OFF, so the driver may feel uncomfortable.

In particular, the position of the vehicle may not be detected after the vehicle is parked for a long time.

Therefore, there is a demand for a connected car service allowing the MT connected car service after a specific time is elapsed from the vehicle start OFF.

SUMMARY

An aspect of the present disclosure provides an apparatus for controlling a vehicle and a method thereof.

Another aspect of the present disclosure provides an apparatus for controlling a vehicle, capable of receiving an MT connected car service even after a specific time is elapsed from vehicle start OFF, and a method thereof.

Still another aspect of the present disclosure provides an apparatus for controlling a vehicle, capable of increasing a time to provide a connected car service after vehicle start OFF by internetworking with a surrounding vehicle through low power communication, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling a vehicle, the apparatus may include a connectivity control unit (CCU) to internetwork with a server through a wireless network to provide a connected car service, and an integrated body unit (IBU) to perform low power communication with another vehicle to control an operation of the CCU.

In forms of the present disclosure, the CCU may include a communication device to make communication with the server, and a connected service device to perform the connected car service by controlling an operation of the communication device depending on a vehicle state.

In forms of the present disclosure, the vehicle state may include a sleep state and a shutdown state, and the communication device may enter into the sleep state when power of a vehicle is accessory (ACC) OFF, and enters into the shutdown state to be deactivated when a specific time is elapsed after entering into the sleep state.

In forms of the present disclosure, the connected car service device may collect vehicle position information, transmits the vehicle position information to the server, encrypts a smart key value in response to a request of the server, and transmits the encrypted smart key to the server, before entering into the shutdown state.

In forms of the present disclosure, the vehicle position information may include at least one of latitude information, longitude information, altitude information, precision information, or information on a time that the ACC OFF occurs, and the server may determine whether to enter the shutdown state, based on the information on the time that the ACC OFF occurs, or requests the smart key value as a determination result.

In forms of the present disclosure, the IBU may include an RF antenna, an RF signal transmission/reception device to modulate or demodulate an RF signal to be transmitted or received through the RF antenna, an LF antenna, an LF signal transmission/reception device to modulate or demodulate an LF signal to be transmitted or received through the LF antenna, and a main controller to control operations of the RF signal transmission/reception device and the LF signal transmission/reception device.

In forms of the present disclosure, the main controller may transmit a specific control signal for activating the communication device to the connected car service device, when receiving the RF signal including a remote wakeup command from the another vehicle in the shutdown state.

In forms of the present disclosure, the control signal may be transmitted through Controlled Area Network (CAN) communication.

In forms of the present disclosure, the connected car service device may connect a HyperText Transfer Protocol (HTTP) session with the server by activating the communication device in response to the control signal, determines a connected car service command, and performs the determined connected car service command.

In foams of the present disclosure, the communication device may periodically wake up in the sleep state to determine whether a short message service (SMS) message is received from the server, and the connected car service device may execute a connected car service command corresponding to the received SMS message by waking up a vehicle whole system, when the SMS message is received as a determination result.

According to another aspect of the present disclosure, a method for controlling a vehicle in a server internetworking with a vehicle through a wireless network to provide a connected car service, may include receiving a first message including a vehicle position information from a first vehicle, determining whether the first vehicle enters into a shutdown state, based on the vehicle position information, obtaining a smart key value corresponding to the first vehicle, when the first vehicle enters into the shutdown state as a determination result, detecting another vehicle equipped with a remote wakeup function around the first vehicle, based on the vehicle position information, and transmitting a remote wakeup command message including the smart key to the detected another vehicle.

According to another aspect of the present disclosure, a method for controlling a vehicle in the vehicle internetworking with a server through a wireless network to provide a connected car service, may include receiving an RF signal from another vehicle in a shutdown state, waking up a communication device in response to the RF signal, determining a connected car service command through connection with the server through the communication device, and executing the determined connected car service command by waking up a whole system of the vehicle.

In foams of the present disclosure, the communication device may enter into a sleep state when ACC OFF occurs, and enters into the shutdown state to be deactivated when a specific time is elapsed after entering into the sleep state.

In forms of the present disclosure, the method further may include collecting vehicle position information before entering into the shutdown state, transmitting the collected position information to the server, and encrypting an smart key value in response to a request of the server to transmit the encrypted smart key value to the server.

In forms of the present disclosure, the vehicle position information may include at least one of latitude information, longitude information, altitude information, precision information, or information on a time that the ACC OFF occurs, and the server may determine whether to enter the shutdown state, based on the information on the time that the ACC OFF occurs, and requests the smart key value as a determination result.

In forms of the present disclosure, the vehicle may include an IBU to perform low power communication with the another vehicle, and the IBU may include an RF antenna, an RF signal transmission/reception device to modulate or demodulate an RF signal to be transmitted or received through the RF antenna, at least one LF antenna, an LF signal transmission/reception device to modulate or demodulate an LF signal to be transmitted or received through the at least one of LF antenna, and a main controller to control operations of the RF signal transmission/reception device or the LF signal transmission/reception device.

In forms of the present disclosure, the main controller may transmit a specific control signal for activating the communication device to the connected car service device, when receiving the RF signal including a remote wakeup command from the another vehicle in the shutdown state.

In forms of the present disclosure, the vehicle may include a CCU internetworking with the IBU to control a connected car service, the CCU may include the communication device and a connected car service device connected with the communication device through Ethernet to perform the connected car service, and the main controller may transmit a specific control signal to the connected car service device through CAN communication to activate the communication device.

In forms of the present disclosure, the method further may include connecting an HTTP session with the server through the activated communication device, determining the connected car service command through the connected session, and executing the determined connected car service command.

In foams of the present disclosure, the communication device periodically may wake up in the sleep state to determine whether an SMS message is received from the server, and the connected car service device may execute a connected car service command corresponding to the received SMS message by waking up a vehicle whole system, when the SMS message is received as a determination result.

The technical problems to be solved by the present inventive concept are not limited to the aforementioned problems, and any other technical problems not mentioned herein will be clearly understood from the following description by those skilled in the art to which the present disclosure pertains.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various foams thereof, given by way of example, reference being made to the accompanying drawings, in which:

FIG. 4 is a view illustrating map matching data received by a CCU from an AUNT, in one form of the present disclosure;

Figure 1:
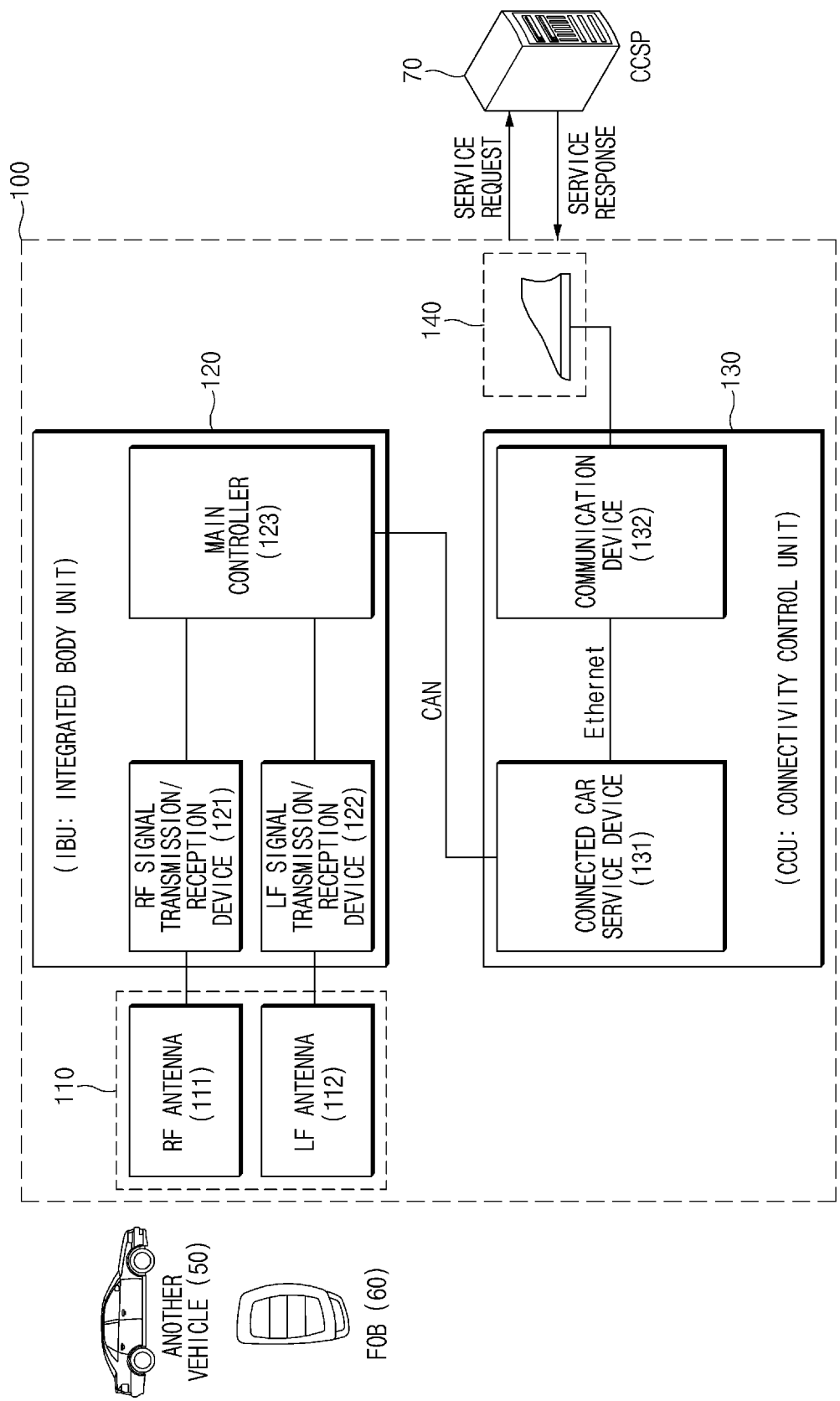
FIG. 1 is a view illustrating the structure of a system for a connected car service, which includes an apparatus for controlling a vehicle, in one foam of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to accompanying drawings. In adding the reference numerals to the components of each drawing, it should be noted that the identical or equivalent component is designated by the identical numeral even when they are displayed on other drawings. In addition, in some forms of the present disclosure, a detailed description of well-known features or functions will be ruled out in order not to unnecessarily obscure the gist of the present disclosure.

In the following description of components in some forms of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such tams as those defined in a generally used dictionary are to be interpreted as having meanings equal to the contextual meanings in the relevant field of art, and are not to be interpreted as having ideal or excessively formal meanings unless clearly defined in the present application.

Hereinafter, forms of the present disclosure will be described with reference to FIGS. 1 to 7.

FIG. 1 is a view illustrating the structure of a system for a connected car service, which includes an apparatus (vehicle controlling apparatus) 100 for controlling a vehicle, in some forms of the present disclosure.

Referring to FIG. 1, the vehicle controlling apparatus 100 may include a first antenna 110, an integrated body unit (IBU), a connectivity control unit (CCU) 130, and a second antenna 140.

The IBU 120 may make communication with an FOB key (smart key) 60 and another vehicle 50 through the first antenna 110.

The IBU 120 may exchange information with the CCU 130 through Controller Area Network (CAN) communication.

In some forms of the present disclosure, the IBU 120 may make the CAN communication with the CCU 130 through a gateway (Gateway).

The CCU 130 may make communication with a Connected Car Service Platform (CCSP) 70 through a second antenna 140.

The first antenna 110 may include an radio frequency (RF) antenna 111 for a signal in an RF frequency band and a low frequency (LF) antenna 112 for a signal in an LF frequency band.

The RF antenna 111 and the LF antenna 112 may be mounted in a vehicle interior, a trunk, a bumper or a door to detect an FOB key 60 and another vehicle 50.

The IBU 120 may include an RF signal transmission/reception device 121, an LF signal transmission/reception device 122, and a main controller 123.

The RF signal transmission/reception device 121 may demodulate and decode a signal received from the RF antenna 111 and may transmit the result signal to the main controller 123. The RF signal transmission/reception device 121 may encode and modulate a message received from the main controller 123 and may output the result signal wirelessly through the RF antenna 111.

The LF signal transmission/reception device 122 may demodulate and decode a signal received from the LF antenna 112 and may transmit the result signal to the main controller 123. The RF signal transmission/reception device 121 may encode and modulate a message received from the main controller 123 and may output the result signal wirelessly through the LF antenna 112.

In some forms of the present disclosure, the LF signal transmission/reception device 122 may generate a position determination request signal for determining a position of the FOB key 60, may output the position determination request signal through the LF antenna 112, and may receive a position determination response signal from the FOB key 60. A vehicle 100 may include a plurality of LF antennas 112. The LF signal transmission/reception device 122 may sequentially or simultaneously transmit position determination request signals through a plurality of LF antennas 112, and may identify an LF antenna 112 having a position determination response signal received therein to identify the position of the FOB key 60.

The IBU 120 may be a device to integrate Electronic Control Units (ECUs) for a body control function, a tire pressure control function, a parking assist function, or a smart key handling function.

In some forms of the present disclosure, the IBU 120, may wake up the CCU 130 through CAN communication, when receiving a specific RF signal from the another vehicle 50 in a sleep state in an MT connected car service shutdown state, through the RF antenna 111 In this case, the vehicle controlling apparatus 100 may periodically wake up while is being maintained in a sleep state for a specific time (for example 168 hours) from the vehicle start OFF and may determine whether to receive an short message service (SMS) from the CCSP 70. The vehicle controlling apparatus 100 may enter in a shutdown state in which an MT connected car service is deactivated in the sleep state when the specific time is elapsed from the vehicle start OFF.

The IBU 120 may transmit a specific RF signal to the another vehicle 110, which is in the shutdown state, in response to a control signal of the CCU 130 to activate the MC connected car service, which is deactivated, of the another vehicle 110.

The CCU 130 may provide a function of establishing a communication session to make communication between the vehicle control units and an external data center including the CCSP 70

The CCU 130 may support CAN and Ethernet communication as well as security and authentication functions.

The CCU 130 may provide a vehicle to everything (V2X) communication function based on a Wireless Access in Vehicular Environment (WAVE) standard, a telematics communication function for a vehicle state report and vehicle remote diagnosis/control, a mobile communication function, a global navigation satellite system (GNSS) signal processing function, through the second antenna 140 which is an external integrated vehicle antenna. In this case, the mobile communication function may include a Wideband Code Division Multiple Access (WCDMA) signal processing function, a Long-Team Evolution (LTE) signal processing function, or a new radio (NR) signal processing function, but the present disclosure is not limited thereto.

The CCSP 70 may be a server that provides various services by connecting a vehicle, a smart device, and a transportation infrastructure in a unity foam.

The CCSP 70 may form big data by collecting, from a vehicle, a huge amount of data to efficiently provide various types of connected car services to a driver.

The CCSP 70 may internetwork with cloud servers to analyze and learn the famed big data and reproduce meaningful information.

When a user requests an MT connected car service using a mobile device of the user, the CCSP 70 receive a command for requesting the MT connected car service to be transmitted to a related vehicle.

In this case, the CCSP 70 may transmit the related command to the vehicle through a hypertext transfer protocol (HTTP) or a short message service (SMS).

In some forms of the present disclosure, the CCU 130 may include a connected car service device 131 and a communication device 132

In this case, the connected car service device 131 and the communication device 132 are connected with each other through Ethernet in the vehicle to exchange information therebetween.

The connected car service device 131 may allow the communication device 132 to enter into the sleep state when the vehicle starts off (that is, accessory (ACC) OFF) and may periodically wake up the communication device 132 to process the MC connected car service command (that is, an SMS message) received from the CCSP 70. The accessory (ACC) OFF is a state in which an engine of the vehicle is not operated, electronic devices inside the vehicle such as audio and a clock are operated.

The communication device 132 may include at least one modem to provide various communication functions. In this case, the modem may be implemented in the form of a field programmable gate array (FPGA), an application-specific integrated circuit (ASIC), or a digital signal processor (DSP).

Figure 2:
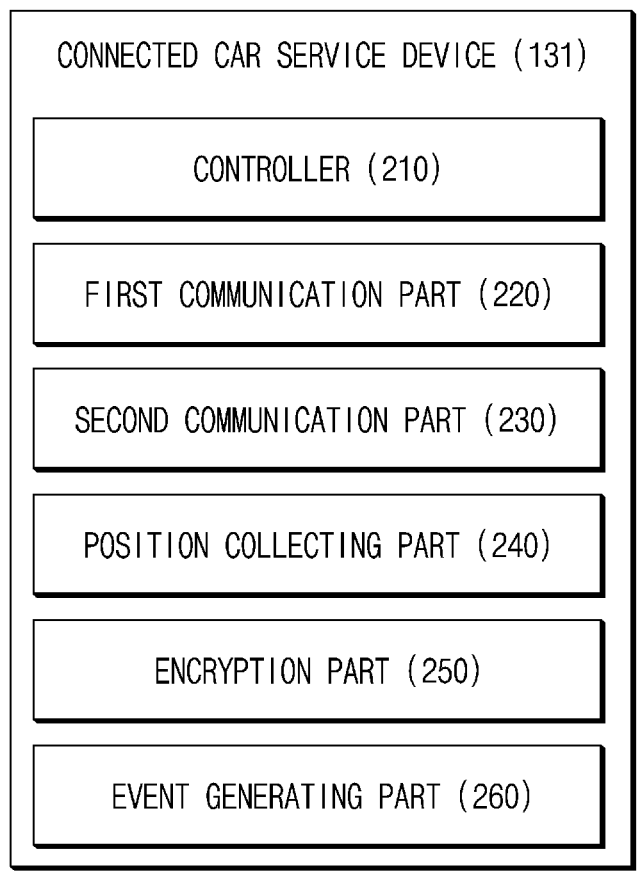
FIG. 2 is a view illustrating the detailed structure of the connected car service device of a CCU, in one form of the present disclosure.

FIG. 2 is a view illustrating the detailed structure of the connected car service device of the CCU, in some forms of the present disclosure.

Referring to FIG. 2, the connected car service device 131 may include a controller 210, a first communication part 220, a second communication part 230, a position collecting part 240, an encryption part 250, and an event generating part 260.

In some forms of the present disclosure, components illustrated in FIG. 2 may be implemented in the form of software or hardware such as Field Programmable Gate Array (FPGA) or Application Specific Integrated Circuit (ASIC), and may perform a specific function.

However, the 'components' are not limited to software or hardware, but may be included in a storage medium for allowing addressing or may be configured to reproduce one or more processors.

The controller 210 may control the overall operation of the connected car service device 131 to provide a connected car service to the ECUs of the vehicle 100.

The first communication part 220 may make CAN communication with the IBU 120.

The second communication part 230 may make Ethernet communication with the communication device 132 of the CCU 130.

The position collecting part 240 may determine a present position of the vehicle based on GPS receive signal information obtained from the communication device 132.

In some forms of the present disclosure, the position collecting part 240 may collect present position information of the vehicle and provide the present position information to the controller 210, before entering into the shutdown state as a specific time (for example, 168 hours) is elapsed after entering the sleep state due to vehicle start OFF. The present position information may include time data and map matching data, which is determined based on map information from an Audio Video Navigation Telmatics (AVNT) device mounted in the vehicle and position information (Latitude/longitude/altitude) calculated from a Global Navigation Satellite System (GNSS). For example, the time data may indicate a time point that vehicle start OFF occurs.

The encryption part 250 may encrypt a FOB key value of the vehicle and may provide the encryption result to the controller 210.

Figure 3:
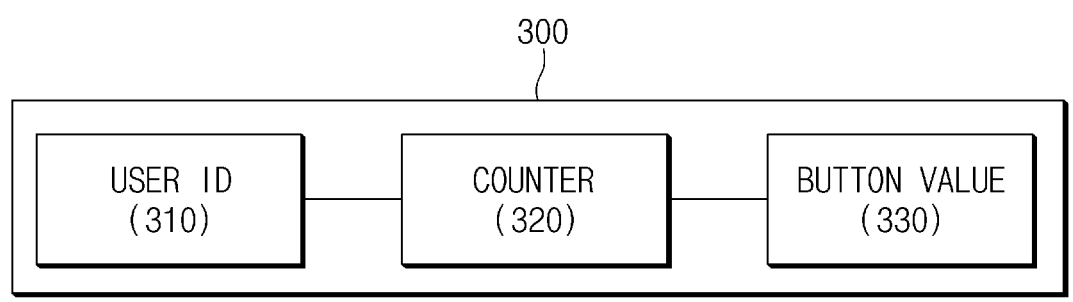
FIG. 3 is a view illustrating the structure of an smart key value, in one form of the present disclosure.

As illustrated in FIG. 3, the FOB key value may include a user identification (UserID), a counter, and a button value.

The encryption part 250 may encrypt the FOB key value after increasing the FOB key value by one and may generate a Remote Keyless Entry (RKE) data.

The event generating part 260 may generate various event signals by using a provided timer.

In some forms of the present disclosure, the event generation part 260 may wake up the communication device 132 by generating a first event signal at a specific cycle after entering into the sleep state. The communication device 132 may periodically wake up in response to the first event signal to determine whether the SMS message is received from the CCSP 70.

In some forms of the present disclosure, the event generation part 260 may generate a second event signal at a first time before the shutdown timer expires after entering into the sleep state.

The controller 210 may transmit present position information and encrypted RKE data to the CCSP 70 through the communication device 132 in response to the second event signal.

When the user requests the MT connected car service through the mobile device of the user in the state that the communication device 132 enters into the shutdown state, the vehicle may not respond to the request for the MC connected car service. Accordingly, a timeout may occur in the mobile device of the user as the response is not received.

The CCSP 70 may determine whether the vehicle enters into the shutdown state, based on time data included in the present position information received from the vehicle 100.

For example, when it is confirmed that the first vehicle enters into the shutdown state, the CCSP 70 identifies a second vehicle position around the present position of the first vehicle, and may determine whether the identified second vehicle is able to wake up the first vehicle.

When the second vehicle is able to wake up the first vehicle as a determination result, the CCSP 70 may transmit the FOB key value of the first vehicle to the second vehicle, and the second vehicle having the FOB key value received therein may transmit the received FOB key value by carrying the received FOB key value through the RF signal.

FIG. 3 is a view illustrating the structure of the FOB key value, in some forms of the present disclosure.

Referring to FIG. 3, an FOB key value may include a user ID 310, a counter 320, and a button value 330.

The user ID 310 may be a unique serial number for identifying a vehicle or vehicle owner.

The counter 320, which is a value for synchronization acquisition, may be encrypted with a specific encryption key and then transmitted.

The button value 330 is button input information for identifying a button, which is pressed, among buttons provided in the FOB 60. In other words, the button value 330 may be a value for identifying a vehicle control command by the user.

For example, the button value 330 may be represented by bits, and a button input such as DOOR LOCK BUTTON, DOOR UNLOCK BUTTON, PANIC BUTTON, or ESCORT BUTTON may be identified based on the button value 330.

The connected car service device 131 may generate the encrypted RKE data including the user ID 310, the counter 320, and the button value 330 through the RF signal transmitted by the FOB 60 and may transmit the RKE data to the CCSP 70. In this case, the connected car service device 131 may increase the value the counter 320, which is transmitted by the FOB 60, by 1 and may transmit the result to the CCSP 70.

FIG. 4 is a view illustrating map matching data received by the CCU 130 from the AUNT.

Referring to FIG. 4, the map matching data 400 may include a map-matched latitude value (Map GNSS LatPos), a map-mapped longitude value (Map GNSS LongPos), a map-matched altitude value (MAP GNSS AltPos), Position Dilution of Precision, which is a coefficient indicating precision deterioration due to GPS celestial placement and refers to a positioning accuracy, Horizontal Dilution of Precision, which is a coefficient indicating precision deterioration due to GPS celestial placement and refers to horizontally positioning accuracy, a GNSS heading value, and a time referring to a time point that vehicle start OFF, that is, ACC OFF occurs.

Figure 5:
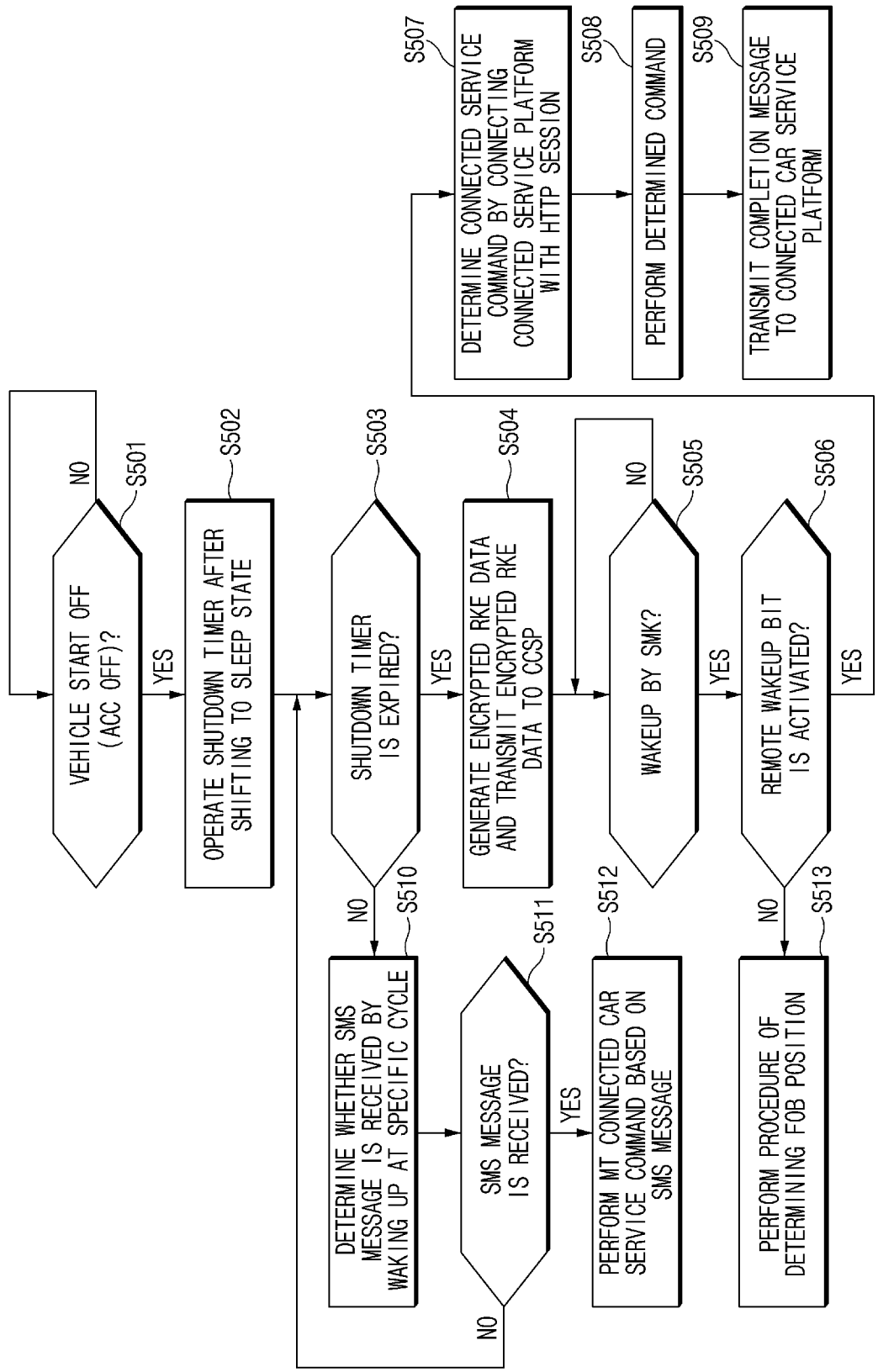
FIG. 5 is a flowchart illustrating a method for controlling a vehicle through low power communication, in one form of the present disclosure.

FIG. 5 is a flowchart illustrating a method for controlling a vehicle through low power communication, in some forms of the present disclosure.

In detail, FIG. 5 illustrates a method for providing the MT connected car service through low power communication.

Referring to FIGS. 1 and 5, the vehicle may operate a shutdown timer after shifting to the sleep state when vehicle start OFF (, that is, ACC OFF) occurs (S501 to S502).

The vehicle may generate encrypted RKE data when the shutdown timer is expired and may transmit the encrypted RKE data to the CCSP 70 (S504).

In some forms of the present disclosure, the CCSP 70 may receive and decrypt the encrypted RKE data and may determine whether the vehicle enters into the shutdown state, based on information on a time that ACC OFF occurs, which is included in the encrypted RKE data.

When the vehicle enters into the shutdown state as the determination result, the CCSP 70 may detect another vehicle equipped with a wakeup function around the vehicle 100, based on position information included in the encrypted RKE data.

The CCSP 70 may transmit a remote wakeup command message for directing the remote wakeup of the vehicle to the detected vehicle (hereinafter, referred to as "another vehicle" for the convenience of explanation). In this case, the remote wakeup command message may include a FOB key value corresponding to the vehicle and a specific command indicator for indicating that the relevant message is a remote wakeup command message. Hereinafter, for the convenience of explanation, the command indicator will be used interchangeably with a remote wakeup bit. For example, when the length of the command indicator is 1 bit, the bit value of 1 may refer to that the remote wakeup command is activated, and the bit value of 0 may refer to that the remote wakeup may be deactivated.

The another vehicle may wake up the vehicle in the shutdown state through low power communication (RF communication).

When the vehicle may wake up by the RF signal output from a smart key system (SMK) of another vehicle, the vehicle decodes the RF signal and determines the activation of the remote wakeup bit (S505 and S506).

When the remote wakeup bit is activated as the determination result, the vehicle may determine the connected car service command by connecting an HTTP session with the CCSP 70 (S507).

The vehicle may perform the determined connected car service command and then transmit, to the CCSP 70, a completion message indicating that the connected car service command is completely performed (S508 and S509).

The CCSP 70 may transmit, to another vehicle, a notification message for indicating that the remote wakeup function is normally and completely performed when receiving the completion message from the vehicle 100.

The vehicle may automatically wake up for a specific period to determine whether the SMS message for the request for the MT connected car service is received from the CCSP 70, when the shutdown timer is not expired in step S503 (S510).

When receiving the SMS message, the vehicle may perform the MT connected car service command based on the SMS message (S511 and S512).

When the remote wakeup bit is deactivated in step S506, the vehicle may perform a procedure of determining the position of the FOB through LF communication (S513).

According to the present disclosure, when a plurality of vehicles equipped with remote wakeup functions according to the present disclosure are present in a specific space such as an apartment parking lot or a public parking lot, a vehicle in a sleep state wakes up a vehicle in a shutdown state through the cooperation between vehicles to provide the MT connected car service.

Figure 6:
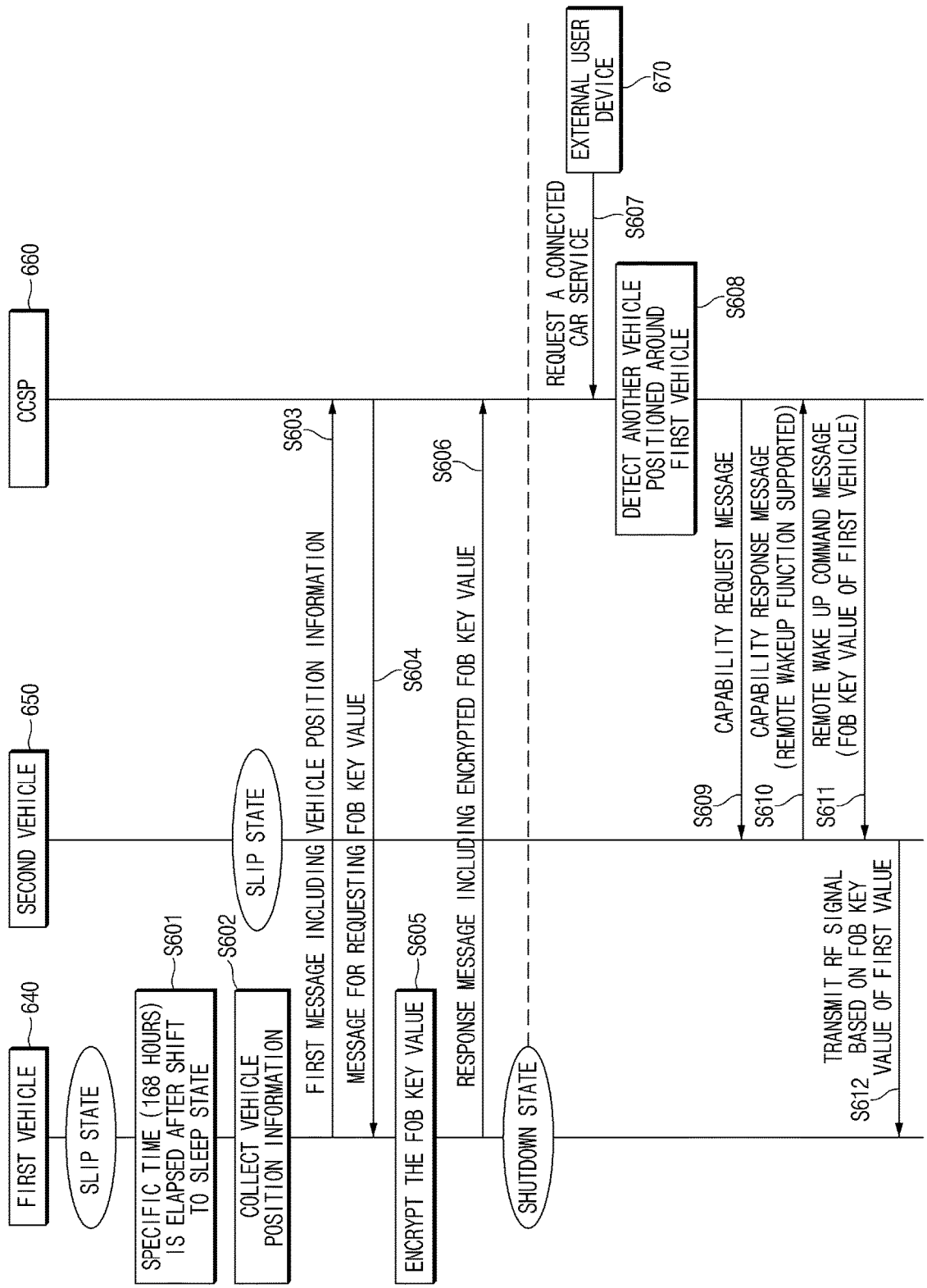
FIG. 6 is a flowchart illustrating a method for controlling a vehicle through low power communication, in one form of the present disclosure.

FIG. 6 is a flowchart illustrating a method for controlling a vehicle through low power communication, in some forms of the present disclosure.

In some forms of the present disclosure, the following description will be made in that that a first vehicle 640 and a second vehicle 650 are vehicles equipped with remote wakeup functions.

Referring to FIG. 6, the first vehicle 610 may collect the present position information of the vehicle when a specific time (for example, 168 hours) is elapsed in the state that a vehicle state is shifted to the sleep state due to vehicle start OFF (S601 and S602).

The first vehicle 610 may transmit a first message including the collected vehicle position information to the CCSP 660 (S603).

The CCSP 660 may transmit, to the first vehicle 640, a message for requesting a FOB key value, when the first vehicle 640 is expected to enter into the shutdown state based on ACC OFF time information included in the received vehicle position information (S604).

The first vehicle 640 may encrypt the FOB key value thereof, which is previously stored, with a specific encryption key (S605).

The first vehicle 640 may transmit a response message including the encrypted FOB key value to the CCSP 660 and then shift to the shutdown state (S606).

The CCSP 660 may receive a message for requesting a connected car service for the first vehicle 640 from an external user device 670 (S607). In this case, the request for the connected car service may be a command for detecting the first vehicle, but the present disclosure is not limited. The request may include a door unlock command or a remote start command.

The CCSP 660 may detect another vehicle positioned around the first vehicle (S606). In this case, the CCSP 660 may identify a vehicle positioned within a specific radius from the first vehicle 640, based on the position information, which is previously collected, of vehicles signed up for the connected car service.

The following description will be made regarding that the second vehicle 650 is positioned around the first vehicle 640.

The CCSP 660 may transmit, to the second vehicle 650, a specific capability request message to ask whether a remote wakeup function is provided (S609).

The second vehicle 650 may transmit, to the CCSP 660, a capability response message to indicate that a remote wakeup function is supported (S610).

The CCSP 660 may transmit, to the second vehicle 650, a remote wakeup command message including the FOB key value of the first vehicle, when it is determined that the second vehicle 650 supports the remote wakeup function (S611).

The second vehicle 650 may transmit an RF signal to wake up the first vehicle 640 based on the FOB key value of the first vehicle 640.

Figure 7:
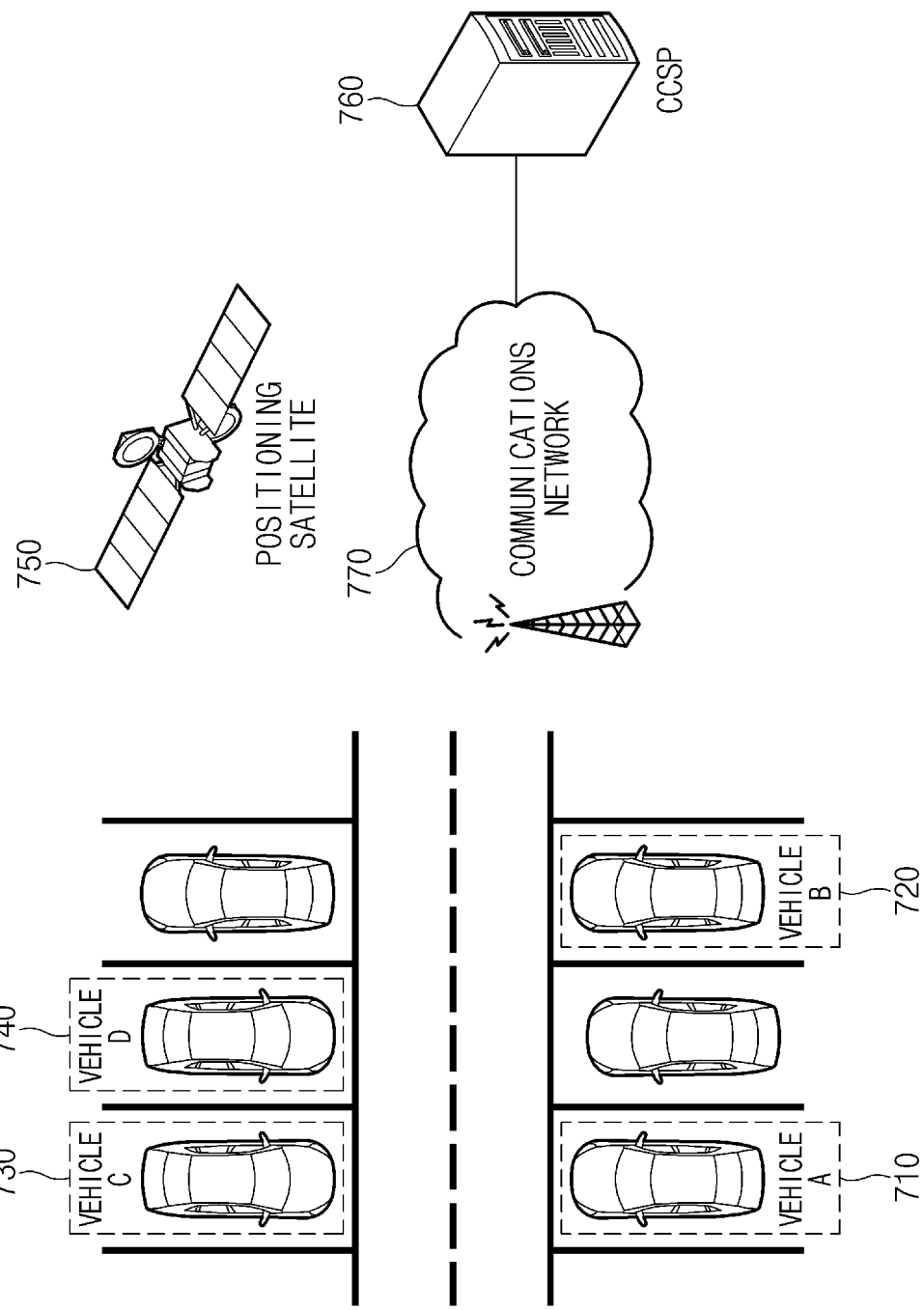
FIG. 7 is a flowchart illustrating a vehicle control system through low power communication, in one foam of the present disclosure.

FIG. 7 is a flowchart illustrating a vehicle control system through low power communication, in some foams of the present disclosure.

Referring to FIG. 7, the state of the communication device of vehicle A 710 may be shifted to a sleep state.

The communication device of the vehicle A 710, the state of which is shifted to the sleep state, wakes up periodically to determine whether to receive an SMS message.

The vehicle A 710 may perform a connected car service corresponding to the SMS message as the whole system of the vehicle A 710 wakes up, when receiving the SMS message.

The vehicle A 710 may internetwork with a positioning satellite 750 and an AUNT (or a head unit) mounted in the vehicle A 710 to collect map-matched vehicle position information, when failing to ACC ON until a specific time (for example 168 hours) is elapsed after the shift to the sleep state. In this case, the vehicle position information may include at least one of latitude information, longitude information, altitude information, precision information, or information on a time that ACC OFF occurs.

The vehicle A 710 may transmit the collected vehicle position information to the CCSP 760 through a communication network 770.

The CCSP 760 may determine that the state of the vehicle A 710 is shifted to the shutdown state based on the received vehicle position information.

When the CCSP 760 transmits a specific FOB key value request message to the vehicle A 710, the vehicle A 710 encrypts the FOB key value thereof with a specific key, which is previously stored, and may transmit the encrypted FOB key value to the CCSP 760.

The CCSP 760 may detect a vehicle that is positioned within a specific radius from the present position of the vehicle A 710 and is equipped with a remote wakeup function.

A vehicle signed up for the connected car service may transmit the present position information of the vehicle to the CCSP 760 in vehicle start OFF. The CCSP 760 may maintain present position information for each vehicle in an internal database of the CCSP 760 and, if necessary, refer to the database to identify another vehicle within a predetermined radius from the target vehicle. In this case, the specific radius may be a distance allowing RF communication.

In some forms of the present disclosure, it is assumed that that vehicle B 720, vehicle C 730, and vehicle D 740 are vehicles within a specific radius from the present position of vehicle A 710 and signed up for the connected car service.

In this case, the vehicle B 720 and the vehicle C 730 may be a vehicle not equipped with remote wakeup function, and the vehicle D 740 may be a vehicle not equipped with the remote wakeup function.

The CCSP 760 may transmit the remote wakeup command message including the FOB key value of the vehicle A 710 to the detected vehicle D 740 in the sleep state (or the ACC ON state).

The vehicle D 740 may output an RF signal based on the received FOB key value.

The vehicle A 710 may wake up in response to the RF signal received from the vehicle D 740, may establish an HTTP session with the CCSP 760, may determine a connected car service command, and may perform the confirmed command.

The operations of the methods or algorithms described in connection with the processor in some foams of the present disclosure may be directly implemented with a hardware module, a software module, or the combinations thereof, executed by the processor. The software module may reside on a storage medium (that a memory or a storage), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor. The processor may read out information from the storage medium and may write information in the storage medium. Alternatively, the storage medium may be integrated with the processor. The processor and storage medium may reside in an application specific integrated circuit (ASIC). The ASIC may reside in a user terminal. Alternatively, the processor and storage medium may reside as separate components of the user terminal.

As described above, the present disclosure may provide an apparatus for controlling a vehicle, capable of providing a connected car service, and a method thereof.

In addition, the present disclosure may provide an apparatus for controlling a vehicle, capable of providing the MT connected car service even after the specific time is elapsed from vehicle start OFF, and a method thereof.

In addition, the present disclosure may provide an apparatus for controlling a vehicle, capable of increasing an allowable time of the MC connected car service by internetworking the surrounding vehicle through the lower power communication after the vehicle start OFF, and a method thereof.

Besides, a variety of effects directly or indirectly understood through the disclosure may be provided.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for controlling a vehicle, the apparatus comprising:
    a connectivity control unit (CCU) to internetwork with a server through a wireless network to provide a connected car service in a vehicle start OFF state; and
    an integrated body unit (IBU) to perform low power communication with another vehicle to control the CCU,
    wherein the CCU further comprises:
        a connected car service device configured to:
            perform the connected car service depending on a vehicle state, wherein the vehicle state includes a sleep state and a shutdown state,
            collect vehicle position information,
            transmit the vehicle position information to the server before entering the shutdown state, and
            encrypt a smart key value in response to a request of the server and transmit the encrypted smart key to the server.

2. The apparatus of claim 1, wherein the CCU further comprises:
    a communication device configured to communicate with the server.

3. The apparatus of claim 2, wherein the communication device is configured to:
    enter into the sleep state when power of the vehicle is accessory (ACC) OFF; and
    enter into the shutdown state when a specific amount of time is elapsed after entering into the sleep state.

4. The apparatus of claim 3, wherein the vehicle position information includes at least one of latitude information, longitude information, altitude information, precision information, or information on a time that the ACC OFF occurs, and
    wherein the server is configured to:
        determine whether to enter the shutdown state based on the information on the time that the ACC OFF occurs; and request the smart key value.

5. The apparatus of claim 2, wherein the IBU further comprises:
    a radio frequency (RF) antenna;
    a RF signal transceiver configured to modulate or demodulate an RF signal to be transmitted or received through the RF antenna;
    a low frequency (LF) antenna;
    a LF signal transceiver configured to modulate or demodulate an LF signal to be transmitted or received through the LF antenna; and
    a main controller configured to control the RF signal transceiver and the LF signal transceiver.

6. The apparatus of claim 5, wherein the main controller is configured to:
    transmit a control signal for activating the communication device to the connected car service device when receiving the RF signal including a remote wakeup command from the another vehicle in the shutdown state.

7. The apparatus of claim 6, wherein the main controller is configured to transmit the control signal through Controlled Area Network (CAN) communication.

8. The apparatus of claim 6, wherein the connected car service device is configured to:
    connect a HyperText Transfer Protocol (HTTP) session with the server by activating the communication device in response to the control signal;
    determine a connected car service command; and
    perform the determined connected car service command.

9. The apparatus of claim 5, wherein the communication device is configured to periodically wake up in the sleep state to determine whether a short message service (SMS) message is received from the server, and
    wherein the connected car service device is configured to execute a connected car service command corresponding to the received SMS message by waking up a vehicle whole system when the SMS message is received.

* * * * *